United States Patent
Lin et al.

(10) Patent No.: US 10,317,721 B2
(45) Date of Patent: Jun. 11, 2019

(54) DUAL-VIEW FIELD DISPLAY PANEL, MANUFACTURING METHOD THEREOF AND DISPLAY DEVICE

(71) Applicant: BOE Technology Group Co., LTD., Beijing (CN)

(72) Inventors: Chia-Chiang Lin, Beijing (CN); Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/769,084

(22) PCT Filed: Dec. 10, 2014

(86) PCT No.: PCT/CN2014/093460
§ 371 (c)(1),
(2) Date: Aug. 19, 2015

(87) PCT Pub. No.: WO2016/037428
PCT Pub. Date: Mar. 17, 2016

(65) Prior Publication Data
US 2016/0252760 A1    Sep. 1, 2016

(30) Foreign Application Priority Data

Sep. 11, 2014 (CN) .......................... 2014 1 0461222

(51) Int. Cl.
*G02B 27/22* (2018.01)
*G02F 1/1335* (2006.01)

(52) U.S. Cl.
CPC ....... *G02F 1/1335* (2013.01); *G02B 27/2214* (2013.01)

(58) Field of Classification Search
CPC ............. G02F 1/1335; G02F 1/133509; G02F 1/133514; G02F 1/133512;
(Continued)

(56) References Cited

U.S. PATENT DOCUMENTS

| 7,154,653 B2 | 12/2006 | Kean et al. |
| 7,580,186 B2 | 8/2009 | Mather et al. |

(Continued)

FOREIGN PATENT DOCUMENTS

| CN | 101281706 A | 10/2008 |
| CN | 202110356 U * | 1/2012 |

(Continued)

OTHER PUBLICATIONS

Second Chinese Office Action including English translation dated Apr. 7, 2016, for corresponding Chinese Application No. 201410461222.3.

(Continued)

*Primary Examiner* — Jade R Chwasz
(74) *Attorney, Agent, or Firm* — Kinney & Lange, P.A.

(57) ABSTRACT

Embodiments of the present invention disclose a dual-view field display panel comprising: a first substrate and a second substrate disposed opposite to the first substrate; and a dual-view grating disposed on a side of the first substrate away from the second substrate, which has a plurality of elongated transparent areas spaced from each other; wherein each of the plurality of elongated transparent areas corresponds to a plurality of rows of pixels and is substantially parallel therewith, and the number of rows of the plurality of rows of pixels corresponding to each of the plurality of elongated transparent areas is selected based on the thickness of the first substrate, so that light from the plurality of rows of pixels is able to be viewed in the left-view field or in the right-view field through a corresponding transparent area. The distance between the dual-view grating and the pixels can be equal to the thickness of the glass substrate by adjusting the number of pixels corresponding to the transparent areas of the dual-view grating, thereby reducing manufacturing process difficulty, resulting in being able to (Continued)

manufacture the dual-view products with existing manufacturing process directly, and increasing the rate of qualified products greatly.

8 Claims, 2 Drawing Sheets

(58) Field of Classification Search
CPC . G02F 1/133504; G02B 5/201; G02B 5/1842; G02B 27/0037; G02B 27/2214; G02B 27/2228
USPC ........ 359/893, 891, 892, 558, 566, 567, 569
See application file for complete search history.

(56) References Cited

U.S. PATENT DOCUMENTS

| | | | | |
|---|---|---|---|---|
| 2009/0021674 A1* | 1/2009 | Louwsma | .......... | G02B 27/2214 349/106 |
| 2010/0328355 A1* | 12/2010 | Fukushima | ........ | G02B 27/2214 345/690 |
| 2013/0155034 A1* | 6/2013 | Nakayama | ................ | G09F 9/35 345/204 |

FOREIGN PATENT DOCUMENTS

| | | |
|---|---|---|
| CN | 202330954 U | 7/2012 |
| CN | 103454807 A | 12/2013 |
| JP | 2005258083 A | 9/2005 |
| JP | 2011203624 A | 10/2011 |
| KR | 20130103019 A | 9/2013 |

OTHER PUBLICATIONS

The International Search Report dated Jun. 16, 2015 for International Application No. PCT/CN2014/093460.
First Chinese Office Action including English translation dated Feb. 24, 2016, for corresponding Chinese Application No. 201410461222.3.
Fourth Chinese Office Action, for Chinese Patent Application No. 201410461223, dated Sep. 21, 2016, 11 pages.
Fifth Chinese Office Action, for Chinese Patent Application No. 201410461222.3, dated Jan. 25, 2017, 9 pages.

* cited by examiner

DUAL-VIEW FIELD DISPLAY PANEL, MANUFACTURING METHOD THEREOF AND DISPLAY DEVICE

CROSS-REFERENCE TO RELATED APPLICATION

This application claims the benefit of Chinese Patent Application No. 201410461222.3 filed on Sep. 11, 2014 in the State Intellectual Property Office of China, the whole disclosure of which is incorporated herein by reference.

BACKGROUND OF THE INVENTION

Field of the Invention

Embodiments of the present invention relate to a dual-view field display panel, a manufacturing method thereof, and a display device including the same.

Description of the Related Art

In a traditional design of dual-view grating, a transparent area corresponds to a row of pixels, so as to achieve that different images are viewed in the left-view field and in the right-view field. Since the distance between the grating and the pixels is fixed and the distance therebetween is 100 μm, for example, for an 8.1-inch SVGA display panel, in order to achieve a suitable view field, a glass substrate is required to be thinned to 100 μm, which goes far beyond limits of the existing process for thinning glass.

SUMMARY OF THE INVENTION

According to one aspect of embodiments of the present invention, a dual-view field display panel is provided. The dual-view field display panel comprises: a first substrate and a second substrate disposed opposite to the first substrate; and a dual-view grating disposed on a side of the first substrate away from the second substrate, which has a plurality of elongated transparent areas spaced from each other; wherein each of the plurality of elongated transparent areas corresponds to a plurality of rows of pixels and is substantially parallel therewith, so that light from the plurality of rows of pixels is able to be viewed in the left-view field or in the right-view field through a corresponding transparent area.

According to an embodiment of the present invention, the thickness of the first substrate is in a range of 200 μm to 500 μm.

According to an embodiment of the present invention, the number of rows of the plurality of rows of pixels corresponding to each of the plurality of elongated transparent areas is selected based on the thickness of one of the first substrate and the second substrate.

According to an embodiment of the present invention, the first substrate is a color film substrate.

According to another aspect of the embodiments of the present invention, a display device is provided, which comprises the dual-view field display panel as described above.

According to another further aspect of the embodiments of the present invention, a manufacturing method of a dual-view field display panel is provided. The dual-view field display panel comprises: a first substrate and a second substrate disposed opposite to the first substrate; and a dual-view grating disposed on a side of the first substrate away from the second substrate, which has a plurality of elongated transparent areas spaced from each other, each of the plurality of elongated transparent areas being substantially parallel with corresponding pixels. Wherein the method comprises steps of: setting a distance between the dual-view grating and the pixels, so that each of the plurality of elongated transparent areas corresponds to a plurality of rows of pixels and light from the plurality of rows of pixels is able to be viewed in the left-view field or in the right-view field through a corresponding transparent area.

Optionally, the distance between the dual-view grating and the pixels is set based on the thickness of the first substrate. Further optionally, the thickness of the first substrate is selected to adjust the number of rows of the plurality of rows of pixels corresponding to each of the plurality of elongated transparent areas.

Optionally, the thickness of the first substrate is in a range of 200 μm to 500 μm.

DETAILED DESCRIPTION OF PREFERRED EMBODIMENTS OF THE INVENTION

Figure 1:
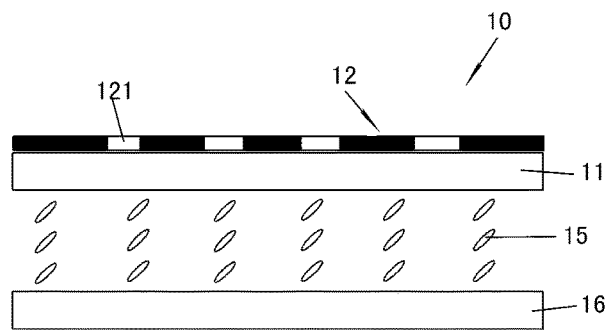
FIG. 1 is a schematic view of the dual-view field display panel according to embodiments of the present invention.

Next, specific implementations of the present invention will be further described in combination with drawings and embodiments.

In addition, in the following detailed description, in order to facilitate the explanation, a number of specific details are explained to provide a comprehensive understanding to the embodiments disclosed in the present invention. However, it is obvious that one or more embodiments may be implemented without these specific details. In other cases, conventional structures and devices are shown in schematic diagrams to simplify the drawings.

In the drawings, the thickness of each film layer and the size and shape of areas do not represent the actual scales of the substrate, the dual-view grating and the pixels. These drawings are only intended to explain the embodiments of the present invention.

The display device according to embodiments of the present invention comprises a dual-view field display panel and other components. The display device may be a dual-view LCD, for example.

As shown in FIG. 1, the dual-view field display panel 10 comprises: a first substrate 11 and a second substrate 16 disposed opposite to the first substrate; and a dual-view grating 12 disposed at a side of the first substrate 11 away from the second substrate 16. Liquid crystal molecules 15 are filled between the first substrate 11 and the second substrate 16. In FIG. 1, the dual-view grating 12 is disposed at an upper side of the first substrate 11. It should be noted that FIGS. 1 and 2 are only schematic, the dual-view grating may also be disposed at a side of the second substrate 16 opposed to the first substrate 11, that is, disposed at a lower side of the second substrate 16.

As shown in FIG. 1, the dual-view grating 12 has a plurality of elongated transparent areas 121 spaced from each other. The elongated transparent areas 121 are longitudinally disposed with regard to the display device. As shown in FIG. 2, the dual-view field display panel 10 further comprises a plurality of pixels 18 having transparent areas 181 of pixels and non-transparent areas 182 of pixels.

The first substrate 11 and the second substrate 16 may be glass substrates. The first substrate 11 may be a color film substrate while the second substrate 16 may be an array substrate, or the first substrate 11 may be an array substrate while the second substrate 16 may be color film substrate.

Figure 2:
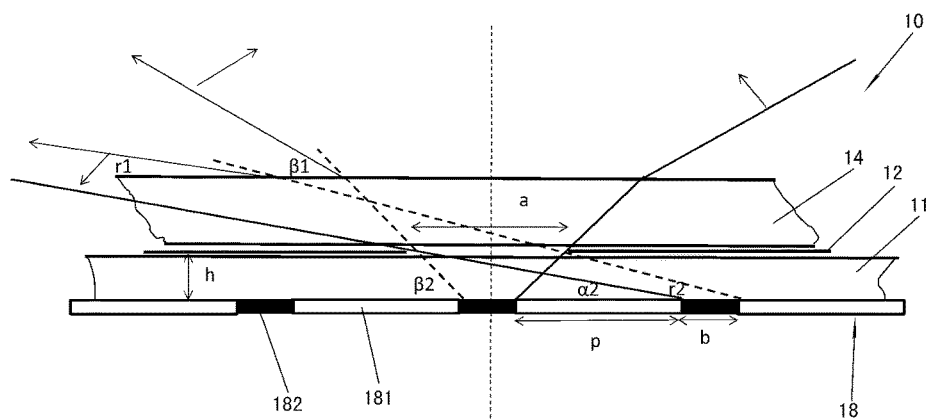
FIG. 2 is a partial schematic view of the dual-view field display panel according to embodiments of the present invention.

As shown in FIGS. 1 and 2, each of the plurality of elongated transparent areas 121 corresponds to a plurality of rows of pixels 18 and is substantially parallel therewith, so that light from the plurality of rows of pixels 18 is able to be viewed in the left-view field or in the right-view field through a corresponding elongated transparent area 121.

According to embodiments of the present invention, the distance between the dual-view grating 12 and the pixels 18 can be equal to the thickness of the glass substrate 11 by adjusting the number of pixels corresponding to the transparent areas 121 of the dual-view grating 12, thereby reducing manufacturing process difficulty, resulting in being able to manufacture the dual-view products with existing manufacturing process directly, and increasing the rate of qualified products greatly.

According to embodiments of the present invention, the thickness of the first substrate 11 is in a range of 200 μm to 500 μm. Similarly, the thickness of the second substrate 16 may also be in a range of 200 μm to 500 μm if the dual-view grating 12 is disposed on the second substrate 16.

Since using the substrate of 200 μm to 500 μm, embodiments of the present invention have several advantages, for example, it is not required to thin the glass substrate to a very small thickness. The distance between the dual-view grating and the pixels can be equal to the thickness of the existing substrate, thereby being able to manufacture the dual-view display panel with existing manufacturing process directly and increasing the rate of qualified products greatly. Thus, according to embodiments of the present invention, a manufacturing process can be conducted as follows: firstly, selecting a suitable substrate; then, determining the number of rows of the plurality of rows of pixels corresponding to each of the plurality of elongated transparent areas based on the thickness of the substrate. Therefore, the dual-view display panel can be manufactured by using existing manufacturing process directly.

According to embodiments of the present invention, the number of rows of the plurality of rows of pixels 18 corresponding to each of the plurality of elongated transparent areas 121 of the dual-view grating 12 may be selected based on the thickness of the first substrate 11. Similarly, if the dual-view grating 12 is disposed on the second substrate 16, the number of rows of the plurality of rows of pixels 18 corresponding to each of the plurality of elongated transparent areas 121 of the dual-view grating 12 may be selected based on the thickness of the second substrate 16.

Referring to FIGS. 1 and 2, in designing the dual-view grating 12, p is a width of a transparent area 181 of pixels, b is a width of a non-transparent area 182 of pixels, a is a width of the transparent area 121 of the grating, h is a distance between the dual-view grating 12 and pixels 18 and β1 and r1 are critical angles of a crosstalk area. In the example as shown in FIG. 2, a glass substrate 14 is disposed at a side of the dual-view grating facing towards the viewer.

A traditional designing manner is to set the width p' of the transparent area 181 of pixels 18 and the width b' of the non-transparent area 182 of pixels, and then to adjust the width a of the transparent area 121 of the grating and the distance h between the dual-view grating 12 and pixels 18, in order to meet the requirement of critical angles β1 and r1.

The designing manner according to embodiments of the present invention is to set the distance h between the dual-view grating 12 and pixels 18, and then to adjust the number n (n=2, 3, 4, 5, 6 . . . ) of the pixels. In other words, compared with the traditional designing manner, p=(p'+b')× n−b', b=b', finally, it is to adjust the value of 'a' in order to meet the requirement of critical angles β1 and r1.

For example, for an 8.1-inch SVGA display panel, in the case that the distance between the dual-view grating 12 and the pixels 18 is equal to the thickness of the color film glass substrate which has a thickness of 100 μm, 300 μm and 500 μm respectively, the following designing values are obtained respectively. The critical angles β1 and r1 which meet the requirement can be still obtained by using the designing manner of adjusting the number n of the pixels. The specific parameters are listed in the following table.

|   | h(μm) | n | p(μm) | b(μm) | a(μm) | r1(degree) | β 1(degree) |
|---|---|---|---|---|---|---|---|
| 1 | 100 | 1 | 62 | 8 | 27 | 39.1 | 81.8 |
| 2 | 300 | 3 | 202 | 8 | 62 | 38.6 | 82.3 |
| 3 | 500 | 5 | 342 | 8 | 102 | 38.9 | 81.9 |

Figure 3:
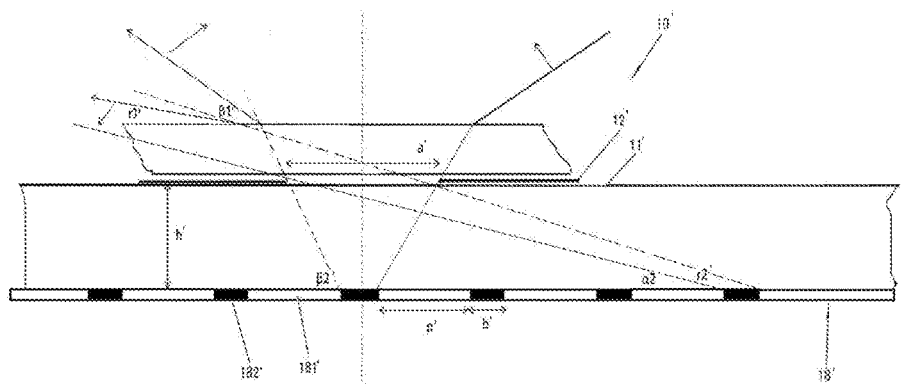
FIG. 3 is a partial schematic view of the dual-view field display panel according to another embodiment of the present invention.

In another example as shown in FIG. 3, a glass substrate is disposed at a side of the dual-view grating 12' facing towards the viewer; and if the dual-view grating 12' is disposed on the first substrate 11', the number of rows of the plurality of rows of pixels 18' corresponding to each of the plurality of elongated transparent areas of the dual-view grating 12' is selected to be three as illustrated, based on the thickness of a first substrate 11'.

Figure 4:
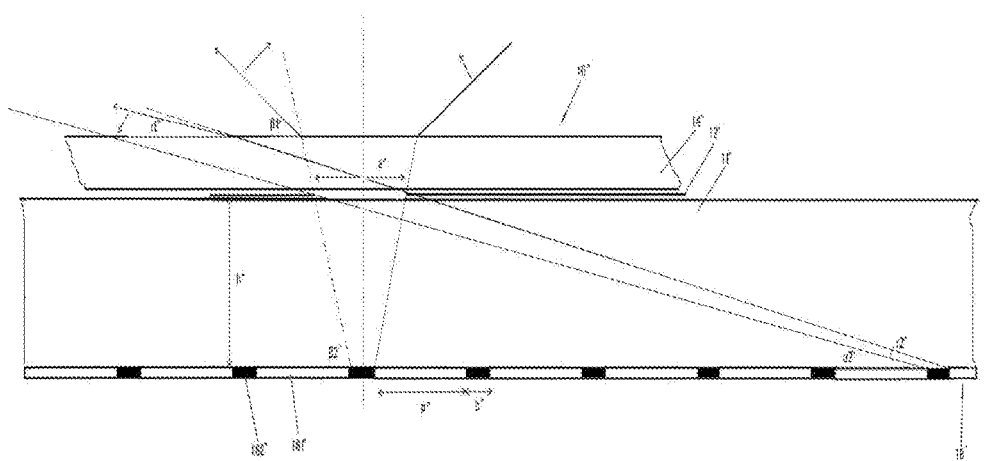
FIG. 4 is a partial schematic view of the dual-view field display panel according to still another embodiment of the present invention.

In still another example as shown in FIG. 4, a glass substrate 14" is disposed at a side of the dual-view grating 12" facing towards the viewer, and if the dual-view grating 12" is disposed on the first substrate 11", the number of rows of the plurality of rows of pixels 18" corresponding to each of the plurality of elongated transparent areas of the dual-view grating 12" is selected to be five as illustrated, based on the thickness of a first substrate 11".

Further, embodiments of the present invention provide a manufacturing method of a dual-view field display panel. The dual-view field display panel comprises: a first substrate 11 and a second substrate 16 disposed opposite to the first substrate 11; and a dual-view grating 12 disposed at a side of the first substrate 11 away from the second substrate 16, which has a plurality of elongated transparent areas 121 spaced from each other, each of the plurality of elongated transparent areas being substantially parallel with corresponding pixels. Wherein the method comprises steps of: setting a distance between the dual-view grating 12 and the pixels 18, so that each of the plurality of elongated transparent areas 121 corresponds to a plurality of rows of pixels 18 and light from the plurality of rows of pixels 18 is able to be viewed in the left-view field or in the right-view field through a corresponding transparent area 121.

Optionally, in the above method, the distance between the dual-view grating 12 and the pixels 18 is set based on the thickness of the first substrate 11. Further, the thickness of the first substrate 11 is selected to adjust the number of rows of the plurality of rows of pixels 18 corresponding to each of the plurality of elongated transparent areas 121.

Optionally, in the above method, the thickness of the first substrate 11 is in a range of 200 μm to 500 μm.

The above implementations are merely used to explain the present invention, but not to limit the present invention, it should be noted that those skilled in the art can make various modifications and changes thereto without departing from the spirit and scope of the present invention. Thus, all the equivalent technical solutions may also fall into the scope of the present invention which is defined by the claims.

What is claimed is:

1. A dual-view field display panel comprising:
   a first substrate and a second substrate disposed opposite to the first substrate, the first substrate being a glass substrate and being one of a color film substrate and an array substrate, and the second substrate being the other one of the color film substrate and the array substrate; and
   a dual-view grating separate from both the first substrate and the second substrate and disposed on a side of the first substrate away from the second substrate, the dual-viewing grating having a plurality of elongated transparent areas spaced apart in a completely mutually separated manner from one another;
   wherein each one of the plurality of elongated transparent areas is arranged corresponding to a plurality of rows of pixels, such that the plurality of rows of pixels are arranged substantially parallel with each one of the plurality of elongated transparent areas, through which light from the plurality of rows of pixels is viewable in a left-view field or a right-view field; and
   wherein a number of rows of the plurality of rows of pixels from which light is viewable in a left-view field or a right-view field through each one of the plurality of elongated transparent areas is selected based on a thickness of the first substrate which is predetermined to be equal to a distance between the dual-view grating and the pixels;
   wherein a value of a width of each of the transparent areas of the dual-view grating is adjusted after the distance between the dual-view grating and the pixels is set and the number n of the pixels is selected, so as to meet a requirement for critical angles of a crosstalk area for the dual-view field display panel; and
   wherein the number n of the pixels is adjusted depending on the following equation, $p=(p'+b')\times n-b'$, $b=b'$, wherein p is a width of one of the transparent areas of pixels and b is a width of one of non-transparent areas of pixels to be adjusted to, p' is a width of one of the transparent areas of pixels and b' is a width of one of the non-transparent areas of pixels by a traditional designing manner, the traditional designing manner comprising:
      setting the width p' and the width b' as fixed values; and
      adjusting a width of one of the transparent areas of the dual-view grating and the distance between the dual-view grating and the pixels to meet the requirement for critical angles of a crosstalk area for the dual-view field display panel.

2. The dual-view field display panel of claim 1, wherein the thickness of the first substrate is in a range of 200 μm to 500 μm.

3. A display device comprising the dual-view field display panel of claim 2.

4. The dual-view field display panel of claim 1, wherein the first substrate is a color film substrate.

5. A display device comprising the dual-view field display panel of claim 4.

6. A display device comprising the dual-view field display panel of claim 1.

7. A manufacturing method of a dual-view field display panel, the dual-view field display panel comprising: a first substrate and a second substrate disposed opposite to the first substrate, the first substrate being a glass substrate and being one of a color film substrate and an array substrate, and the second substrate being the other one of the color film substrate and the array substrate; and a dual-view grating separate from both the first substrate and the second substrate and disposed on a side of the first substrate away from the second substrate, the dual-view grating having a plurality of elongated transparent areas spaced apart in a completely mutually separated manner from one another, each one of the plurality of elongated transparent areas is arranged corresponding to a plurality of rows of pixels, such that the plurality of rows of pixels are arranged substantially parallel with each one of the plurality of elongated transparent areas, through which light from the plurality of rows of pixels is viewable in a left-view field or a right-view field, wherein the method comprises:
   setting a distance between the dual-view grating and the pixels to be equal to a thickness of the first substrate; and
   selecting a number of rows of the plurality of rows of pixels from which light is viewable in a left-view field or a right-view field through each one of the plurality of elongated transparent areas, based on the distance between the dual-view grating and the pixels;
   wherein by setting the distance between the dual-view grating and the pixels and using a designing manner of selecting the number n of the pixels, the requirement for critical angles of a crosstalk area for the dual-view field display panel is met; and
   wherein the number n of the pixels is adjusted depending on the following equation, $p=(p'+b')\times n-b'$, $b=b'$, wherein p is a width of one of the transparent areas of pixels and b is a width of one of non-transparent areas of pixels to be adjusted to, p' is a width of one of the transparent areas of pixels and b' is a width of one of the non-transparent areas of pixels by a traditional designing manner, the traditional designing manner comprising:
      setting the width p' and the width b' as fixed values; and
      adjusting a width of one of the transparent areas of the dual-view grating and the distance between the dual-view grating and the pixels to meet the requirement for critical angles of a crosstalk area for the dual-view field display panel.

8. The manufacturing method of claim 7, wherein the thickness of the first substrate is in a range of 200 μm to 500 μm.

* * * * *